US009296275B2

(12) United States Patent
Huyghe

(10) Patent No.: US 9,296,275 B2
(45) Date of Patent: Mar. 29, 2016

(54) MULTI-FUNCTION INFRARED HEATING DEVICE

(71) Applicant: DENSO International America, Inc., Southfield, MI (US)

(72) Inventor: Erik P. Huyghe, Rochester Hills, MI (US)

(73) Assignee: Denso International America, Inc., Southfield, MI (US)

( * ) Notice: Subject to any disclaimer, the term of this patent is extended or adjusted under 35 U.S.C. 154(b) by 547 days.

(21) Appl. No.: 13/734,316

(22) Filed: Jan. 4, 2013

(65) Prior Publication Data

US 2014/0191049 A1 Jul. 10, 2014

(51) Int. Cl.

| | |
|---|---|
| ***B60H 1/22*** | (2006.01) |
| ***F24H 3/04*** | (2006.01) |
| ***F24H 9/00*** | (2006.01) |
| *B60H 1/02* | (2006.01) |
| *B61D 27/00* | (2006.01) |
| *F24D 5/08* | (2006.01) |

(52) U.S. Cl.

CPC ............ *B60H 1/2225* (2013.01); *F24H 3/0429* (2013.01); *F24H 9/0063* (2013.01); *B60H 1/22* (2013.01); *B60H 2001/229* (2013.01); *F01P 2060/08* (2013.01)

(58) Field of Classification Search

CPC ................... B60H 2001/229; B60H 2001/003; B60H 2001/00307; B60H 1/22; B60H 1/02; B60H 1/2212; B60H 1/2225; F01P 2060/08; F01P 2060/18; B61D 27/0036; F24D 5/08; F24H 9/0063; F24H 3/0429

USPC ......... 237/45, 12.3 A, 12.3 B, 12.3 C, 33, 77; 165/41, 42, 51, 148, 164, 184, 185; 219/202; 392/416, 423–425

See application file for complete search history.

(56) References Cited

U.S. PATENT DOCUMENTS

| | | | | | |
|---|---|---|---|---|---|
| 1,704,873 | A | * | 3/1929 | Strout | F24C 7/002 219/200 |
| 1,868,411 | A | * | 7/1932 | De Ferranti | 392/423 |
| 3,064,902 | A | * | 11/1962 | Moore et al. | 237/33 |
| 3,072,339 | A | * | 1/1963 | Lamburn et al. | 237/12.3 A |
| 3,619,555 | A | * | 11/1971 | Bassett, Jr. | B60H 1/2225 219/202 |
| 4,590,888 | A | * | 5/1986 | Mosig | 122/149 |
| 4,916,353 | A | * | 4/1990 | Danko et al. | 313/113 |
| 5,056,501 | A | * | 10/1991 | Ida | B60H 1/2212 126/110 B |
| 5,128,851 | A | * | 7/1992 | Kosmatka et al. | 362/390 |
| 5,738,506 | A | * | 4/1998 | Mosig et al. | 431/90 |
| 6,021,752 | A | * | 2/2000 | Wahle | B60H 1/2209 123/142.5 R |
| 6,131,553 | A | * | 10/2000 | Suzuki | B60H 1/032 123/556 |

(Continued)

FOREIGN PATENT DOCUMENTS

| | | | | | |
|---|---|---|---|---|---|
| GB | 280683 | A | * | 11/1927 | B61D 27/0036 |
| GB | 449055 | A | * | 6/1936 | B61D 27/0036 |

(Continued)

*Primary Examiner* — Gregory Huson
*Assistant Examiner* — Daniel E Namay
(74) *Attorney, Agent, or Firm* — Harness, Dickey & Pierce, P.L.C.

(57) ABSTRACT

A vehicle infrared heating assembly including an infrared energy source within a housing. A first conduit extends from the housing to direct infrared energy generated by the infrared energy source to a windshield of a vehicle. A second conduit extends from the housing to direct the infrared energy to a passenger cabin of the vehicle.

8 Claims, 4 Drawing Sheets

(56) References Cited

U.S. PATENT DOCUMENTS

| | | | | |
|---|---|---|---|---|
| 6,281,620 | B1 * | 8/2001 | Yeh | 313/113 |
| 7,248,790 | B2 | 7/2007 | Misumi et al. | |
| 7,597,552 | B2 * | 10/2009 | Young | B60H 1/2206 237/12.3 C |
| 7,886,815 | B2 * | 2/2011 | Errington | B60H 1/00764 165/202 |
| 8,693,853 | B2 * | 4/2014 | Olver et al. | 392/407 |
| 8,910,881 | B2 * | 12/2014 | Ludwig | 237/12.3 A |
| 2003/0173413 | A1 * | 9/2003 | Schlecht et al. | 237/12.3 C |
| 2004/0008981 | A1 * | 1/2004 | Woo et al. | 392/424 |
| 2004/0175162 | A1 * | 9/2004 | Linow et al. | 392/424 |
| 2006/0076006 | A1 * | 4/2006 | Duguay et al. | 126/271.1 |
| 2006/0078318 | A1 * | 4/2006 | Misumi et al. | 392/407 |
| 2006/0151623 | A1 * | 7/2006 | Haefner et al. | 237/12.3 C |
| 2008/0128525 | A1 * | 6/2008 | Ludwig | 237/12.3 A |
| 2009/0016706 | A1 * | 1/2009 | Hayashida | H01L 21/67115 392/416 |
| 2009/0107974 | A1 * | 4/2009 | Testa | 219/208 |
| 2009/0277969 | A1 * | 11/2009 | Briselden | 237/76 |
| 2010/0006663 | A1 * | 1/2010 | Linscheidt | F23D 11/345 237/12.3 C |
| 2010/0187211 | A1 | 7/2010 | Eisenhour et al. | |
| 2011/0127246 | A1 | 6/2011 | Heiden et al. | |

FOREIGN PATENT DOCUMENTS

| | | | | | |
|---|---|---|---|---|---|
| GB | 526379 | A | * | 9/1940 | B61D 27/0036 |
| GB | 2189314 | A | * | 10/1987 | F23C 3/002 |
| GB | EP 2248692 | A2 | * | 11/2010 | B60H 1/2225 |
| JP | 06102404 | A | * | 4/1994 | G02B 5/08 |
| JP | 2005007963 | A | * | 1/2005 | |

* cited by examiner 210
214
212
220
224

222
216
232
218

322
314
318
312
310
336
328A
330
320
320
328B
332
334
338
328D
316
324
328C
326

MULTI-FUNCTION INFRARED HEATING DEVICE

FIELD

The present disclosure relates to a vehicle heating system, and particularly to a multi-function infrared heating device.

BACKGROUND

This section provides background information related to the present disclosure, which is not necessarily prior art.

Nearly all motor vehicles include a heater, which generally heats a passenger cabin of the vehicle and defogs the vehicle's windshield. A typical heater uses excess heat generated by the vehicle's internal combustion engine. Most of an engine's excess heat is absorbed by a circulating liquid coolant, which is typically a mixture of water and antifreeze. The heated coolant is carried from the engine through heater hoses to a heater core. Heated liquid coolant circulates through tubes in the heater core. A fan blowing across the tubes directs heat to the passenger cabin to heat the cabin. The heat can also be directed to the windshield and/or windows to defog them. The temperature of the coolant decreases after the heat is transferred to the heater core. The coolant is then circulated back to the engine to absorb excess heat again, which makes for a continuous system.

To conserve fuel, smaller vehicle engines, which generate less heat, are becoming more and more common. In the case of electric vehicles, the engine is often eliminated altogether. A heater and heating system that does not rely on the vehicle's engine would therefore be desirable. A heater with enhanced efficiency would also be desirable, such as a heater that can heat specific portions of the passenger cabin, passengers, and/or a particular object instead of indiscriminately heating the entire cabin.

SUMMARY

This section provides a general summary of the disclosure, and is not a comprehensive disclosure of its full scope or all of its features, The present teachings provide for a vehicle infrared heating assembly. The assembly includes an infrared energy source within a housing. A first conduit extends from the housing to direct infrared energy generated by the infrared energy source to a windshield of a vehicle. A second conduit extends from the housing to direct the infrared energy to a passenger cabin of the vehicle.

The present teachings also provide for a vehicle infrared heating assembly including an infrared energy source within an inner housing. An outer housing is spaced apart from the inner housing to define a conduit therebetween. An inlet port is in communication with the conduit for conveying fluid into the conduit to be heated by infrared energy generated by the infrared energy source. An outlet port is in communication with the conduit to convey fluid out from within the conduit.

The present teachings further provide for a vehicle infrared heating assembly including an infrared energy source within a first housing. A second housing is mounted relative to the first housing. A first conduit is defined by the second housing. Infrared energy generated by the infrared energy source heats fluid in the first conduit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
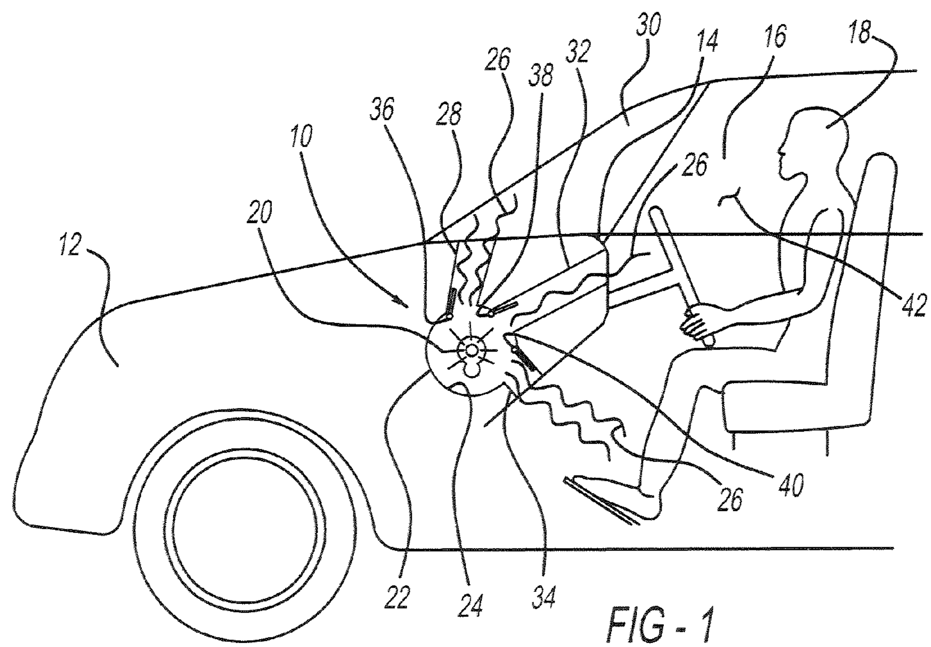
FIG. 1 illustrates an infrared heating assembly according to the present teachings installed in a vehicle.

With initial reference to FIG. 1, an infrared heating assembly according to the present teachings is generally illustrated at reference numeral 10. The infrared heating assembly 10 is illustrated as installed in a vehicle 12, behind a dashboard 14 of a passenger cabin 16. Seated in the passenger cabin 16 is an occupant 18. The infrared heating assembly 10 can be installed in any suitable vehicle, such as an automobile, an aircraft, a watercraft, or a military vehicle, for example. Installation and use of the infrared heating assembly 10 is not limited to vehicles, and thus it can be installed at any suitable location where heat is desired, such as in a building or at an outdoor location.

The infrared heating assembly 10 includes an infrared energy source 20 mounted within a housing 22 having an inner surface 24. The infrared energy source 20 can be any suitable source of infrared energy, such as an infrared light, a suitable ceramic, or a suitable metallic. Any suitable infrared wavelength can be selected based on the infrared energy absorption characteristics of the items or fluids to be heated. Setting the wavelength to maximize the infrared energy absorbed enhances efficiency. For example, the infrared energy wavelength can be tuned to about 3,000 nm to heat items containing water, such as a person or engine coolant. The inner surface 24 is configured to substantially or entirely reflect infrared energy 26, such that the infrared energy 26 is not entirely absorbed by the housing 22, but is rather directed out from within the housing 22 to introduce heat to a desired location, as described herein.

The infrared heating assembly 10 further includes a defog conduit 28 extending from the housing 22 to windshield 30. The defog conduit 28 can also be arranged to direct the infrared energy 26 to a window 42 of the vehicle 12, or to any other suitable location in the vehicle. The windshield 30 and window 42 can include a suitable coating to prevent the infrared energy 26 from merely passing therethrough without heating the windshield 30 or window 42. The infrared heating assembly 10 further includes a face conduit 32 and a foot conduit 34. The face conduit 32 extends from the housing 22 to the passenger cabin 16, and is oriented to direct infrared energy 26 in the general direction of the upper body or face of the occupant 18. The foot conduit 34 also extends from the housing 22 to the passenger cabin 16, and is oriented to direct infrared energy 26 in the general direction of the lower body or feet of the occupant 18. The conduits 28, 32, and 34 can be any suitable conduits to transfer infrared energy 26 with minimal or no transmission loss, such as fiber optic cables.

The conduits 28, 32, and 34 can also be orientated to extend to any suitable location of the vehicle 12 to direct infrared energy 26 to any location where heat is desired. For example, one of the conduits 28, 32, or 34, or an additional conduit, can be directed to a glove box to warm gloves seated therein, to a storage container to heat the contents thereof, such as food, or to one or more seats of the passenger cabin 16 to heat the seats. Providing the conduits 28, 32, or 34 as a flexible fiber optic cable permits the conduits 28, 32, or 34 to be easily routed to nearly any suitable location of the vehicle 12 with minimal transmission loss. The infrared heating assembly 10 maximizes use of the infrared energy 26 generated by the infrared energy source 20 by using the infrared energy 26 generated from a single infrared energy source 20 to both heat the passenger cabin and defog the windshield 30 and/or window 42. Furthermore, because infrared energy 26 is used, the energy 26 can be directed to specific locations where heat is desired, such as at the occupant 18, and thus the entire passenger cabin 16 need not be heated, which would require use of additional resources.

The infrared heating assembly 10 further includes a defog door 36, a face door 38, and a foot door 40, each of which partially or entirely reflect infrared energy 26. The defog door 36 is mounted where defog conduit 28 connects to the housing 22 as illustrated, or at any suitable position along the length of the defog conduit 28. The defog door 36 is movable between a first position (illustrated in FIG. 1), in which the defog door 36 does not obstruct passage of infrared energy 26 through the defog conduit 28, thereby permitting the infrared energy 26 to pass from within the housing 22 to the windshield 30. The defog door 36 can be moved to a second position in which the defog door 36 does obstruct passage of infrared energy 26 through the defog conduit 28, thereby preventing infrared energy 26 from reaching the windshield 30 so that the windshield 30 is not heated. The face door 38 is also movable between a first position and a second position. FIG. 1 illustrates the first position in which the face door 38 does not obstruct infrared energy 26 from passing through the face conduit 32 to the passenger cabin 16. In the second position, the face door 38 extends across the face conduit 32, thereby preventing infrared energy 26 from passing through the face conduit 32 to the passenger cabin 16. The foot door 40 is illustrated in a first position in FIG. 1, in which infrared energy 26 is allowed to pass through the foot conduit 34 unobstructed by the foot door 40. In a second position, the foot door 40 extends across the foot conduit, thereby preventing infrared light from passing through the foot conduit 34 to the passenger cabin 16. The amount of infrared energy 26 passing through each conduit 28, 32, and 34 can be varied in any suitable manner. For example, the intensity of the infrared energy source 20 can be varied, and/or one or more materials of variable opacity or polarizing filters can be arranged at any suitable position, such as within the conduits 28, 32, and 34.

Figure 2:
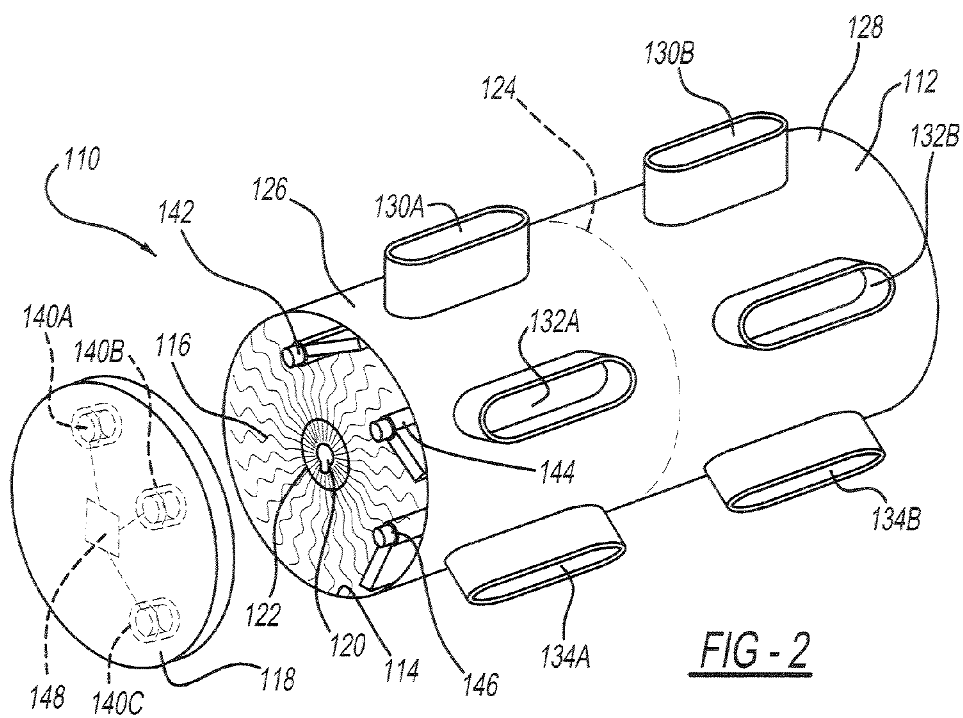
FIG. 2 is a perspective view of another infrared heating assembly according to the present teachings.

With additional reference to FIG. 2, another infrared heating assembly according to the present teachings is generally illustrated at reference numeral 110. The infrared heating assembly 110 generally includes an outer housing 112 with an inner surface 114 that substantially or entirely reflects infrared energy 116. An end cap 118 mates with the outer housing 112 to seal the contents of the outer housing 112 therein and prevent foreign substances from entering the outer housing 112. The infrared heating assembly 110 can be mounted in any vehicle or at any suitable location where heat is desired. For example, the infrared heating assembly 110 can be mounted in the vehicle 12 of FIG. 1.

The outer housing 112 includes an infrared energy source 120, which generates infrared energy 116. The infrared source 120 may be seated within a protective inner housing 122, which is at least substantially transparent to infrared energy 116 and mounted within the outer housing 112 in any suitable manner. The infrared source 120 can be any suitable source of infrared energy 116, such as an infrared light, a suitable ceramic, a suitable metal, or any other appropriate infrared energy source.

The outer housing 112 may include a divider 124 that extends across an interior of the outer housing 112 to generally divide the outer housing 112 into a first zone 126 and a second zone 128. The divider 124 can be any divider suitable to prevent passage of infrared energy 116 therethrough. When the infrared heating assembly 110 is provided with the divider 124, the infrared heating assembly 110 can include two infrared sources 120, with a first infrared source 120 mounted within the first zone 126 and a second infrared source 120 mounted within the second zone 128.

Providing the infrared heating assembly 110 with multiple infrared sources 120 is optional, and can provide greater temperature control options. For example, infrared energy 116 of a first intensity generated in the first zone 126 can be directed to the driver's side of the passenger cabin 16, and infrared energy 116 of a second intensity generated in the second zone 128, which can be different than the first intensity, can be directed to a passenger side of the passenger cabin 16. In this manner, personal preferences of the driver and the passenger can be accommodated. For example, if a driver requests additional heat, the infrared source 120 of the first zone 126 can be configured to emit a greater amount of infrared energy 116. If a passenger of the passenger cabin 16 becomes too warm, the infrared source 120 of the second zone 128 can be lowered in intensity so as to produce less infrared energy 116, and less heat.

The first zone 126 includes a defog conduit 130A, a face conduit 132A, and a foot conduit 134A. Similarly, the second zone 128 includes a defog conduit 130B, a face conduit 132B, and a foot conduit 134B. Mounted to the end cap 118 are door mounts 140A, 140B, and 140C. Mounted to the door mounts 140A, 140B, and 140C, when the end cap 118 is mounted to the remainder of the outer housing 112, are a plurality of doors that control passage of infrared energy 116 through each of the conduits 130A, 132A, 134A, 130B, 132B, and 134B. Specifically, a defog door 142 is mounted to the door mount 140A to control passage of infrared energy 116 through the defog conduits 130A and 130B. Two defog doors 142 can be provided to individually regulate passage of infrared energy 116 through each of the defog conduits 130A and 130B. A face door 144 is mounted to the door mount 140B and regulates passage of infrared energy 116 from the infrared source 120 through the face conduit 132A and the face conduit 132B. Two face doors 144 can be provided to individually regulate passage of infrared energy 116 through each of the face conduits 132A and 132B. A foot door 146 is mounted to the door mount 140C, and regulates passage of infrared energy 116 through the foot conduit 134A and the foot conduit 134B. Two foot doors 146 can be mounted to the door mount 140 to individually regulate passage of infrared energy 116 through the foot conduits 134A and 134B. Actuation of the defog door 142, the face door 144, and the foot door 146 is controlled by a motor 148, which can be mounted to the end cap 118. The motor 148 can be any motor suitable to actuate the doors 142, 144 and 146, such as a servo motor. The motor 148 rotates the door mounts 140A, 140B, and 140C to rotate the doors 142, 144, and 146 coupled thereto. One or more motors can be used to rotate the doors 142, 144, and 146. At an end of the outer housing 112 opposite to the end cap 118, the doors 142, 144, and 146 can be connected to mounts similar to the mounts 140A, 140B, and 140C to support the doors 142, 144, and 146 so they extend across the length of the outer housing 112. The doors 142, 144, and 146 partially or entirely reflect the infrared energy 116.

Output of the infrared heating assembly 110 can be controlled using the defog door 142, the face door 144, and the foot door 146 respectively. For example, to direct infrared energy 116 from the infrared source 120 to the windshield 30 in order to defog the windshield 30, the defog door 142 is moved with the motor 148 such that defog door 142 does not block either the defog conduit 130A or the defog conduit 130B. In instances where it is not necessary to defog the windshield 30, the defog door 142 can be rotated such that it does block the defog conduits 130A and 130B and thus prevents infrared energy 116 from passing from within the outer housing 112 through either the defog conduit 130A or the defog conduit 130B. To direct infrared energy 116 to the upper body of the occupant 18, such as towards the face of the occupant 18, the face door 144 is rotated using the motor 148 such that it does not block the face conduits 132A and 132B, thereby permitting infrared energy 116 to pass through the face conduits 132A and 132B. If heat is not desired at the upper body or face of the occupant 18, the face door 144 is rotated by the motor 148 so that it does block the face conduits 132A and 132B. The foot door 146 can similarly be rotated with the motor 148 to block the foot conduits 134A and 134B when heat is not desired at a lower body of the occupant 18, such as at the occupant's feet. If heat is desired, the foot door 146 can be rotated with the motor 148 to not block the foot conduits 134A and 134B. Although the doors 142, 144, and 146 are described as simultaneously either blocking or not blocking the conduits associated therewith, individual doors for each of the conduits 130A, 130B, 132A, 132B, 134A, or 134B may be provided, so as to selectively permit or restrict infrared energy 116 from passing from the infrared source 120 through each of the conduits 130A, 130B, 132A, 132B, 134A, or 134B. The amount of infrared energy 116 passing through each conduit 130A/B, 132A/B, and 134A/B can be varied in any suitable manner. For example, the intensity of the infrared energy source 120 can be varied, and/or one or more materials of variable opacity or polarizing filters can be arranged at any suitable position, such as within the conduits 130A/B, 132A/B, and 134A/B.

Figure 3A:
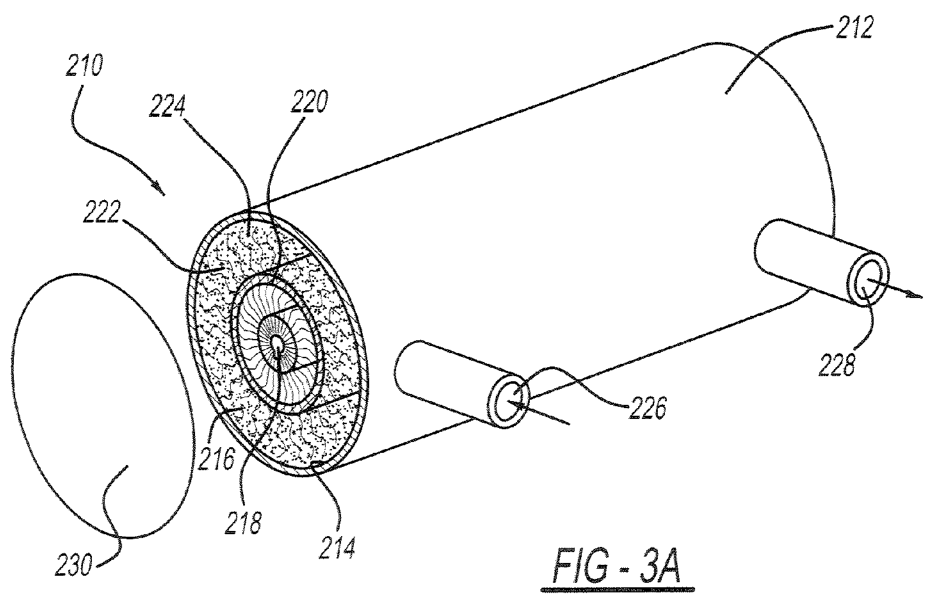
FIG. 3A is a perspective view of an additional infrared heating assembly according to the present teachings.

With reference to FIG. 3A, another infrared heating assembly according to the present teachings is illustrated at reference numeral 210. The infrared heating assembly 210 includes an outer housing 212, which is generally cylindrical and includes an inner surface 214 that substantially or entirely reflects infrared energy 216 generated by infrared energy source 218. The infrared source 218 is mounted within an inner housing 220, which is mounted within the outer housing 212 in any suitable manner and generally extends along a longitudinal axis of the infrared heating assembly 210. The infrared source 218 can be any suitable source of infrared energy 216, such as an infrared light, a suitable ceramic, or a suitable metallic. The amount of infrared energy 216 passing through the conduit 222 can be varied in any suitable manner. For example, the intensity of the infrared energy source 218 can be varied, and/or one or more materials of variable opacity or polarizing filters can be arranged at any suitable position, such as within the conduit 222.

A conduit 222 is defined between the inner housing 220 and the inner surface 214 of the outer housing 212. The conduit 222 is configured to convey any suitable substance through the conduit 222, such as a fluid 224. The fluid 224 can include, for example, wiper fluid, fuel, engine oil, brake fluid, power steering fluid, transmission fluid, battery coolant, or any other substance used with the vehicle 12 to be heated. In addition to being used with the vehicle 12, the infrared heating assembly 210 can be used with any suitable device or system to heat most any fluid.

The fluid 224 can be introduced into the conduit 222 through inlet port 226, and can be withdrawn from the conduit 222 through outlet port 228. The inlet port 226 and the outlet port 228 both extend from the outer housing 212 and are in fluid communication with the conduit 222. The inlet port 226 and the outlet port 228 are arranged at opposite ends of the infrared heating assembly 210. During operation of the infrared heating assembly 210, infrared energy 216 generated by the infrared source 218 radiates out from within the inner housing 220, which is substantially or entirely transparent to infrared energy 216 emanating out from within the inner housing 220, and into the conduit 222 where the infrared energy 216 heats the fluid 224 flowing through the conduit 222. To enhance efficiency of the infrared heating assembly 210, at least a portion of infrared energy 216 reflects off of the inner surface 214 of the outer housing 212 in order to further heat the fluid 224. The inner housing 220 can alternatively absorb infrared energy 216, which is particularly suitable for heating fluid 224 that is transparent to infrared energy 216. When the inner housing 220 is configured to absorb infrared energy 216, such as with a suitable infrared absorbing coating, the inner housing 220 will itself be heated by the infrared energy 216. The heat of the inner housing 220 will transfer to the fluid 224 to heat the fluid 224. A cover 230 seals the outer housing 212 and also substantially or entirely reflects infrared energy 216.

Figure 3C:
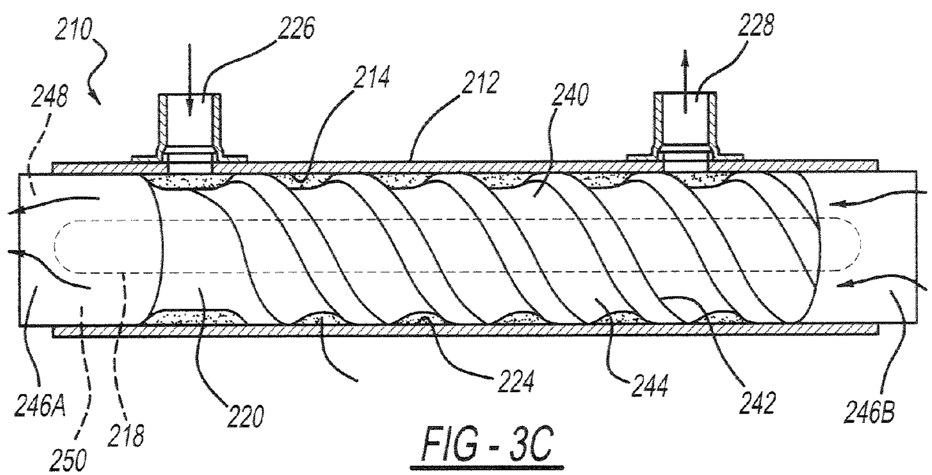
FIG. 3C is a cross-sectional view of still another infrared heating assembly according to the present teachings.
Figure 3B:
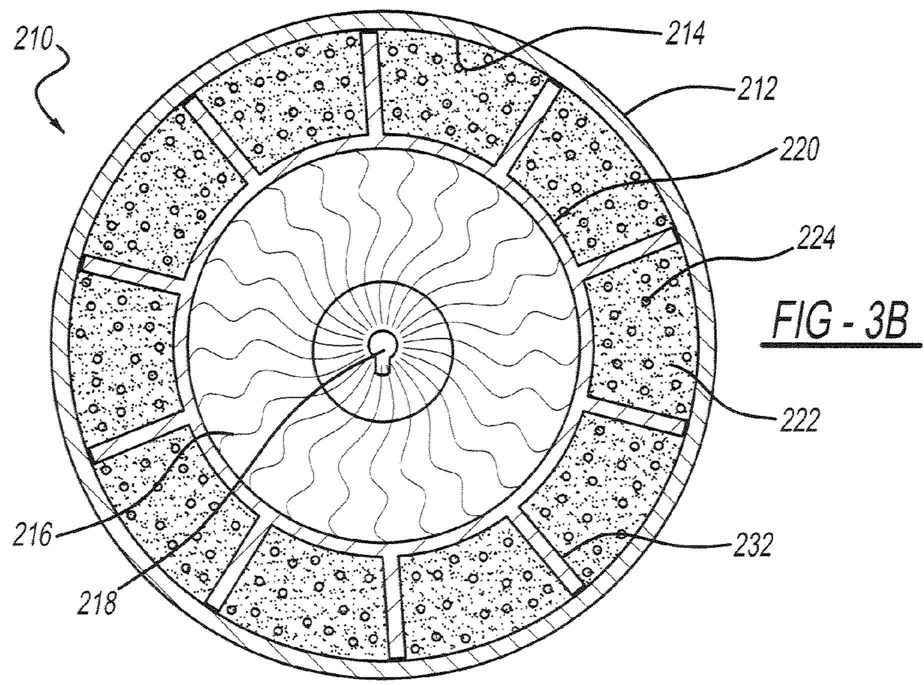
FIG. 3B is a cross-sectional view of another infrared heating assembly according to the present teachings.

As illustrated in FIG. 3B, the infrared heating assembly 210 can further include a plurality of fins 232, each of which extend from the inner housing 220 to the inner surface 214 of the outer housing 212. The fins 232 can support the inner housing 220 within the outer housing 212 and/or support the outer housing 212 about the inner housing 220. The outer housing 212 and the fins 232 can absorb infrared energy 216 to heat both the inner housing 220 and the fins 232. Fluid 224 passing over the heated inner housing 220 and the fins 232 will itself be heated. The fins 232 increase the heated surface area that the fluid 224 is exposed to, thereby heating the fluid 224 more quickly and efficiently. The fins 232 are particularly useful to heat the fluid 224 when the fluid 224 is transparent to infrared energy.

With reference to FIG. 3C, the inner housing 220 can include an outer surface 240 with a spiral-shaped ridge 242 extending along the outer surface 240 from about the inlet port 226 to about the outlet port 228. The ridge 242 extends to and contacts the inner surface 214 of outer housing 212 and defines a spiral-shaped fluid passageway 244 between the ridges 242 that also extends from about the inlet port 226 to about the outlet port 228. Fluid, such as fluid 224, entering through the inlet port 226 passes to the passageway 244 and flows along the spiral-shaped fluid passageway 244 to the outlet port 228. The infrared source 218 heats the outer surface 240 to thereby heat the fluid flowing over the outer surface 240. The spiral-shaped fluid passageway 244 serves to enhance circulation of fluid passed through the infrared heating assembly 210, thereby increasing the heat transfer area between the outer surface 240 and the fluid and more thoroughly heat the fluid. To retain the fluid in the spiral-shaped passageway 244 between the inlet port 226 and the outlet port 228, the inner housing 220 includes a first end 246A and a second end 246B at opposite ends of the spiral-shaped fluid passageway 244. Both the first end 246A and the second end 246B extend to and contact the inner surface 214 to prevent fluid from flowing past the first end 246A and the second end 246B. A conduit 248 is defined between the infrared source 218 and the inner housing 220. Fluid 250 can be passed through the conduit 248 from the second end 246B to the first end 246A of the inner housing 220, or in the opposite direction. As the fluid 250 passes over the infrared source 218, the fluid 250 is heated by the infrared energy 216. The fluid 250 can include, for example, wiper fluid, fuel, engine oil, brake fluid, power steering fluid, transmission fluid, battery coolant, or any other substance used with the vehicle 12 to be heated.

Figure 4:
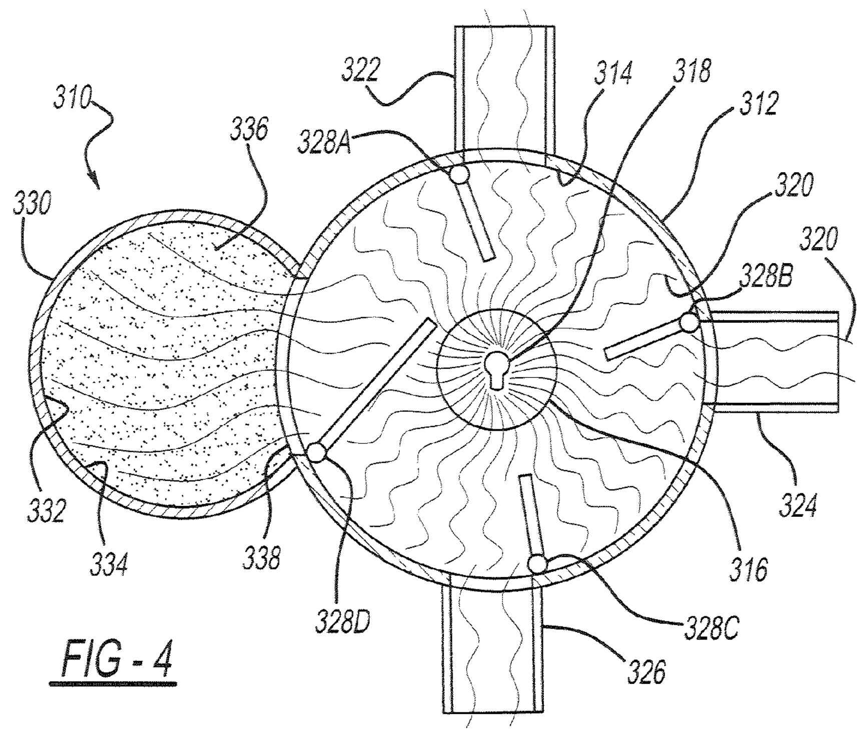
FIG. 4 is a cross-sectional view of an additional infrared heating assembly according to the present teachings.

With reference to FIG. 4, an additional infrared heating assembly according to the present teachings is generally illustrated at reference numeral 310. The infrared heating assembly 310 generally includes an outer housing 312 with an inner surface 314 configured to at least substantially reflect infrared energy, such as with a suitable reflective coating. Mounted within the outer housing 312 is an optional inner housing 316, which provides a protective housing for the infrared energy source 318. The infrared energy source 318 can be any suitable source of infrared energy 320, such as an infrared light, a suitable ceramic, or a suitable metal.

Extending from the outer housing 312 is a defog conduit 322, a face conduit 324, and a foot conduit 326. The defog conduit 322 is similar to the defog conduit 28 of FIG. 1, and thus directs infrared energy 320 generated by the infrared energy source 318 to, for example, the windshield 30 of the vehicle 12. The face conduit 324 is similar to the face conduit 32 of FIG. 1, and directs infrared energy 320 to, for example, an upper portion of the passenger cabin 16 and the face of the occupant 18. The foot conduit 326 is similar to the foot conduit 34 of FIG. 1, and directs infrared energy 320 towards, for example, a lower portion of the passenger cabin 16 and the feet of the occupant 18. The conduits 322, 324, and 326 can extend to any area where heat is desired, and can include doors to regulate output of infrared energy 320 therethrough, such as the doors 328A-328C. Other areas to where one or more of the conduits 322, 324, and 326 may extend include, for example, a vehicle glove box to warm a pair of gloves, a food container to warm any suitable food item therein, or a generic storage bin to warm any suitable item placed within the bin. Use of the infrared heating assembly 310 is not limited to the vehicle 12. The assembly 310 can be used with any suitable device or system in which heat is desired. The amount of infrared energy 320 passing through each conduit 322, 324, and 326 can be varied in any suitable manner. For example, the intensity of the infrared energy source 318 can be varied, and/or one or more materials of variable opacity or polarizing filters can be arranged at any suitable position, such as within the conduits 322, 324, and 326.

The infrared heating assembly 310 further includes a fluid housing 330. The fluid housing 330 has an inner surface 332, which substantially or entirely reflects the infrared energy 320 generated by the infrared energy source 318. The inner surface 332 defines a fluid conduit 334. The fluid conduit 334 is suitable for conducting passage of any suitable fluid 336 therethrough. Suitable fluids include, for example, wiper fluid, fuel, engine oil, brake fluid, transmission fluid, battery coolant, or power steering fluid. Any other suitable fluid to be warmed can also be passed through the fluid conduit 334. The reflective inner surface 332 directs infrared energy 320 to the fluid 336 to further heat the fluid 336. The inner surface 332 can alternatively absorb infrared energy 320, which is particularly suitable for heating fluid 336 that is transparent to infrared energy 320. When the inner surface 332 is configured to absorb infrared energy 320, such as with a suitable infrared absorbing coating, the inner surface 332 will itself be heated by the infrared energy 320. The heat of the inner surface 332 will heat the fluid 336.

The fluid housing 330 is mounted to the outer housing 312 in any suitable manner. The outer housing 312 includes a transparent portion 338 where the fluid housing 330 is mounted to the outer housing 312. The transparent portion 338 is substantially or entirely transparent to the infrared energy 320 generated by the infrared energy source 318. Therefore, the infrared energy 320 can pass out from within the outer housing 312 and into the fluid housing 330 to heat the fluid 336. The infrared heating assembly 310 can thus direct infrared energy 320 to: the windshield 30 to defog the windshield 30; the passenger cabin 16 to heat the passenger cabin 16 and contents thereof; and to the fluid housing 330 to heat any suitable fluid 336 passed through the fluid conduit 334 defined by the fluid housing 330. Because the infrared heating assembly 310 can operate with only a single infrared energy source 318, it is able to provide heat in an efficient and cost effective manner. A door 328D can be provided at the interface between the outer housing 312 and the fluid housing 330 to regulate passage of infrared energy 320 to the fluid housing 330. The amount of infrared energy 320 passing to the fluid housing 330 can be varied in any suitable manner. For example, the intensity of the infrared energy source 318 can be varied, and/or one or more materials of variable opacity or polarizing filters can be arranged at any suitable position, such as between the infrared energy source 318 and the fluid housing 330.

Figure 5:
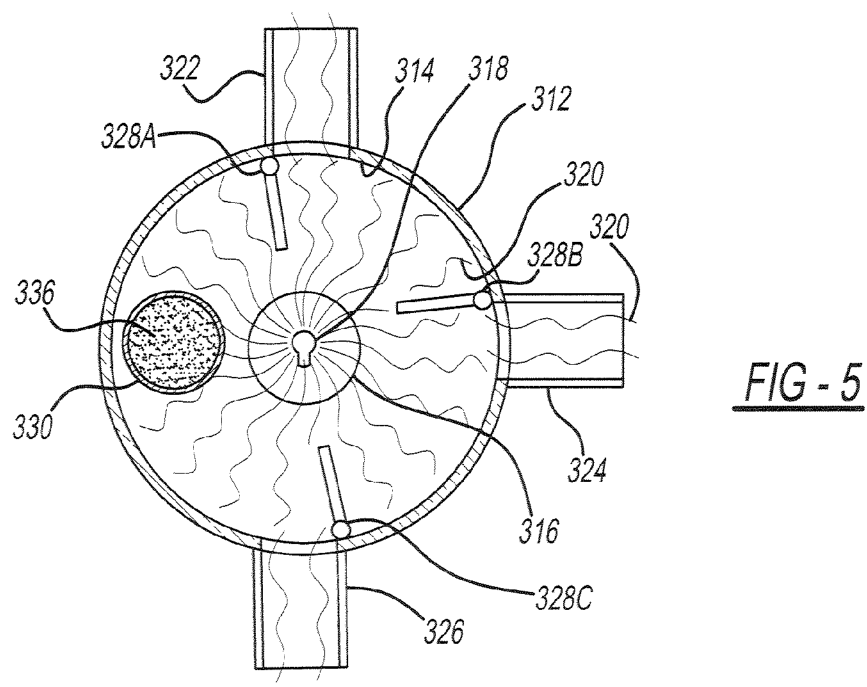
FIG. 5 is a cross-sectional view of yet another infrared heating assembly according to the present teachings.

With additional reference to FIG. 5, the fluid housing 330 can be mounted within the outer housing 312 in any suitable manner. The fluid housing 330 can be transparent to the infrared energy 320 or can absorb the infrared energy 320 with a suitable absorbent coating. When the fluid housing 330 is absorbent, it will be heated by the infrared energy 320 and heat will be transferred to fluid 336 within the fluid housing 330. If the fluid 336 is infrared absorbent, the fluid housing 330 may be transparent to permit infrared energy 320 to pass directly to the fluid 336 and heat the fluid 336.

Figure 6:
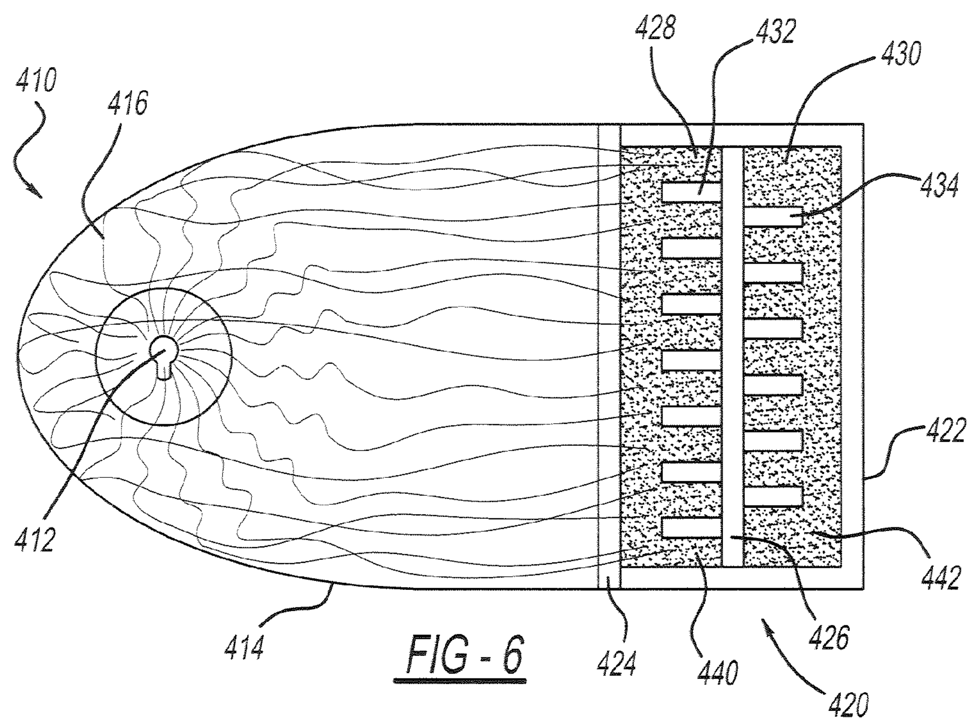
FIG. 6 illustrates an additional infrared heating assembly according to the present teachings.

With reference to FIG. 6, an additional infrared heating assembly according to the present teachings is illustrated at reference numeral 410. The assembly 410 generally includes an infrared energy source 412, which can be similar to any of the other infrared energy sources described herein. The infrared energy source 412 is mounted in any suitable manner within a parabolic reflector 414. The parabolic reflector 414 is shaped and internally coated with any suitable material to direct infrared energy 416 generated by the infrared energy source 412 towards fluid housing 420.

The fluid housing 420 includes an outer casing 422. The outer casing 422 is coupled to the parabolic reflector 414. Specifically, an outer wall 424 of the outer casing 422 is coupled to the parabolic reflector 414. The outer casing 422 includes an inner wall 426 that extends across the outer casing 422 to divide a fluid conduit defined by the outer casing 422 into a first conduit 428 and a second conduit 430. The second conduit 430 is optional and thus the inner wall 426 can be the outermost wall of the fluid housing 420. Extending from the inner wall 426 into the first conduit 428 are first fins 432. Extending from the inner wall 426 into the second conduit 430 are second fins 434.

The outer wall 424 can be made of any suitable infrared absorbent or transparent material. For example, if fluid 440 in the first conduit 428 is infrared absorbent, then the outer wall 424 will be transparent to allow the infrared energy 416 to pass through the outer wall 424 to heat fluid 440 within the first conduit 428. The surfaces defining the first conduit 428 other than the outer wall 424 can be reflective to facilitate heating of the fluid 440. If the fluid 440 is infrared transparent, then the outer wall 424 can be made infrared absorbent rather than transparent in order to heat the fluid 440 within the first conduit 428. The fins 432 can also be infrared absorbent or reflective to facilitate heating of the fluid 440.

If the outer wall 424 is transparent to infrared energy 416, the inner wall 426 can also be transparent to allow the infrared energy 416 to pass through the inner wall 426 to heat the fluid 442 within the second conduit 430, particularly when the fluid 442 is infrared absorbent. If the fluid 442 of the second conduit 430 is infrared transparent, then the inner wall 426 and the fins 434 can be made infrared absorbent. Regardless of whether the outer wall 424 is transparent or absorbent, the inner wall 426, fins 432 and 434, and the outer casing 422 can be infrared absorbent or reflective to heat infrared transparent or absorbent fluids respectively. For transparent fluids the inner wall 426 and the outer casing 422 can be heated by the infrared energy 416 to heat fluids 440 and 442, for example. If the fluids 440 and 442 are absorbent, the fluids 440 and 442 can be heated by direct contact with the infrared energy 416.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle infrared heating assembly comprising:

an infrared energy source within a housing which is generally cylindrical;

a first conduit extending from the housing to direct infrared energy generated by the infrared energy source to a windshield of a vehicle; and a second conduit extending from the housing to direct the infrared energy to a passenger cabin of the vehicle, wherein:

the housing includes a reflective inner surface operable to at least partially reflect the infrared energy.

2. The vehicle infrared heating assembly of claim 1, wherein the infrared energy source is an infrared light.

3. The vehicle infrared heating assembly of claim 1, wherein the first conduit is a fiber optic cable.

4. The vehicle infrared heating assembly of claim 1, further comprising a first door rotatable between a first position in which the first door permits passage of infrared energy through the first conduit, and a second position in which the first door restricts passage of infrared energy through the first conduit.

5. The vehicle infrared heating assembly of claim 4, further comprising a second door rotatable between a first position in which the second door permits passage of infrared energy through the second conduit, and a second position in which the second door restricts passage of infrared energy through the second conduit.

6. The vehicle infrared heating assembly of claim 1, further comprising a third conduit extending from the housing to direct the infrared energy to the passenger cabin of the vehicle;

wherein the second conduit is configured to extend towards an upper portion of the passenger cabin, and the third conduit is configured to extend towards a lower portion of the passenger cabin.

7. The vehicle infrared heating assembly of claim 1, wherein the vehicle infrared heating assembly includes only a single infrared energy source.

8. The vehicle infrared heating assembly of claim 1, wherein the infrared energy source is a first infrared energy source, the assembly further comprising:

a second infrared energy source within the housing;

a divider within the housing separating the housing into a first portion including the first infrared energy source and a second portion including the second infrared energy source, the divider at least substantially restricts passage of infrared energy therethrough, the first conduit and the second conduit extend from the first portion of the housing to conduct infrared energy generated by the first infrared energy source;

a third conduit extending from the second portion of the housing to direct infrared energy generated by the second infrared energy source to the windshield of the vehicle; and a fourth conduit extending from the second portion of the housing to direct infrared energy generated by the second infrared energy source to the passenger cabin of the vehicle.

* * * * *